United States Patent [19]  [11]  4,316,003
Dante et al.  [45]  Feb. 16, 1982

[54] EPOXY RESIN CURING AGENTS

[75] Inventors: Mark F. Dante; Roy A. Allen, both of Houston, Tex.

[73] Assignee: Shell Oil Company, Houston, Tex.

[21] Appl. No.: 199,801

[22] Filed: Oct. 23, 1980

[51] Int. Cl.³ ............................................. C08G 59/50
[52] U.S. Cl. .................... 528/111; 525/504; 525/507; 528/120; 528/407; 564/306; 564/325; 564/452
[58] Field of Search ...................... 528/111, 120, 407; 525/504, 507; 564/306, 325, 452

[56] References Cited

U.S. PATENT DOCUMENTS

| | | | |
|---|---|---|---|
| 2,633,458 | 3/1953 | Shokal | 260/45.2 |
| 2,658,885 | 11/1953 | D'Alelio | 260/53 |
| 2,864,775 | 12/1958 | Newey | 528/111 |
| 2,901,461 | 8/1959 | Auerbach et al. | 528/111 |
| 3,336,241 | 8/1967 | Shokal | 260/2 |
| 3,356,624 | 12/1967 | Neal et al. | 260/18 |
| 3,408,219 | 10/1968 | Neal et al. | 117/37 |
| 3,446,762 | 5/1969 | Lopez et al. | 260/18 |
| 3,637,618 | 1/1972 | May | 260/837 R |
| 3,993,707 | 11/1976 | Cummings | 528/120 X |
| 4,152,285 | 5/1979 | Thomassen | 528/111 X |

*Primary Examiner*—Earl A. Nielsen
*Attorney, Agent, or Firm*—Norris E. Faringer

[57] ABSTRACT

An adduct suitable for curing epoxy resins, particularly in water-borne systems, comprises first reacting an epoxy resin, preferably a saturated epoxy resin, with a primary monoamine and then reacting the resulting condensate with a polyfunctional amine.

14 Claims, No Drawings

EPOXY RESIN CURING AGENTS

BACKGROUND OF THE INVENTION

Epoxy resins have been used successfully in the formation of corrosion resistant maintenance-type coatings for years. These coatings have been applied from solvent solution using brush, roller of spray gun. Recent trends in environmental protection and health regulations have required that the solvents used for applying many types of coating agents must now be drastically reduced or eliminated. See, for example, Rule 442 of the Southern California Air Pollution Control District which replaces Rule 66 of the Los Angeles Air Pollution Control District.

Also, because of increased awareness of safety and health hazards, there is greater emphasis being placed on the toxicity of certain curing agents used in resin formulations. For example, the volatility of certain amines to cure epoxy resins under certain conditions create potential health hazards.

Films prepared from epoxy resins cured with amines are known; however, as noted, some amines present potential health hazards and the resulting films tend to exhibit excessive blushing; are slow to cure, i.e., take a long time to reach an acceptable degree of hardness; and are not readily useable in a water-borne system.

Most of these shortcomings can be partially eliminated by preparing an amine adduct with an epoxy resin. Thus, if excess amine is used to prepare the adduct, the resulting condensate can be used as an epoxy curing agent. When such amine-epoxy adducts are employed as epoxy curing agents the blushing and toxicity is reduced and the coating system has better handleability; however, these systems still have water sensitivity problems which tend to limit their use to organic solvent formulations.

It has now been found that faster curing times are possible as well as significantly reduced blushing and reduced toxicity is achieved when the epoxy curing agent is prepared in a two-step process using at least two different amines. More importantly, the resulting epoxy curing agent has decreased water sensitivity and is therefore useable in a water-borne system.

SUMMARY OF THE INVENTION

The present invention is directed to an improved epoxy curing agent adduct prepared by first reacting an epoxy compound with less than a stoichiometric amount of a primary monoamine and then reacting the resulting epoxy-containing reaction product with a stoichiometric excess of a polyfunctional amine.

The present invention is further directed to curable epoxy compositions containing these novel epoxy curing agents and to water-borne systems prepared therefrom.

DESCRIPTION OF THE PREFERRED EMBODIMENTS

The present invention is particularly directed to epoxy curing agents which are especially suitable for use in water-borne systems and produce epoxy-based coatings which exhibit reduced blushing and faster drying times. The epoxy curing agent adducts of the present invention are prepared by (A) reacting (1) an epoxy resin, preferably a saturated epoxy resin, containing at least one vicinal epoxy group per molecule with (2) a primary monoamine in the chemical equivalent ratio of epoxy to amine groups of from about 2:1 to about 5:4, and then (B) reacting the resulting condensate with a polyfunctional amine in the chemical equivalent ratio of epoxy to amine groups of from about 1.0:1.25 to about 1.0:3.0.

Polyepoxides

The polyepoxides used to prepare the instant epoxy curing agents comprise those compounds containing at least one vicinal epoxy group; i.e., at least one

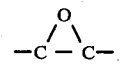

group. These polyepoxides may be saturated or unsaturated, aliphatic, cycloaliphatic, aromatic or heterocyclic and may be substituted if desired with non-interfering subsitutents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. Nos. 3,356,624, 3,408,219, 3,446,762, and 3,637,618 and so much of the disclosure relevant to examples of epoxy compounds is incorporated by reference into this specification.

Other examples of suitable polyepoxides include the glycidyl ethers of novolac resins, i.e., phenol-aldehyde condensates. Preferred resins of this type are those of the formula:

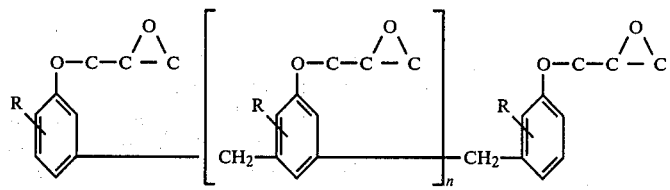

wherein R is hydrogen or an alkyl radical and n is an integer of 1 to about 10. Preparation of these polyepoxides is illustrated in U.S. Pat. No. 2,658,885.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

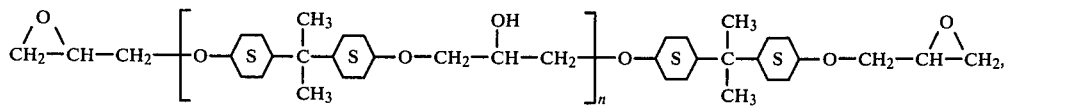

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

It will be appreciated that suitable polyepoxides which can be cured with the instant novel epoxy curing agents are the polyepoxides used to prepare the epoxy curing agents in the first place.

Primary Monoamines

Suitable primary monoamines used in the first step in the preparation of the instant epoxy curing agents have the following general structure:

R—NH₂ wherein R is an alkyl, aryl, alkaryl or alkanol radical. In general, suitable alkylamines contain up to about 20 carbon atoms and preferably from about 4 to 18 carbon atoms. Suitable alkylamines include butylamine, heptylamine, cyclohexylamine, hexylamine, octylamine, nonylamine, decylamine, undecylamine, dodecylamine, etc. Suitable arylamines and alkarylamines contain up to about 16 carbon atoms such as phenylamine (aniline), benzylamine, tolylamine, xylylamine, naphthylamine and the like.

Suitable alkanolamines contain from about 2 to about 18 carbon atoms and preferably from about 2 to 6 carbon atoms, such as ethanolamine, propanolamine, isopropanolamine, butanolamine, hexanolamine, etc.

Very suitable primary monoamines include the aliphatic primary amines possessing aliphatic chains ranging from 8 to 18 carbon atoms and mixtures of these homologues commercially available under the trade designation of "ARMEEN".

Polyfunctional Amines

Suitable polyfunctional amines used in the second step, i.e., to react with the epoxy-amine condensate of the first step, have the following general formula:

wherein each R is an alkyl, aryl or alkaryl radical of up to about 8 carbon atoms and x has a value of from about 0 to about 10, and preferably 1 to 3.

Examples of suitable such polyfunctional amines include, among others, diethylenetriamine and

as well as cycloaliphatic amines such as

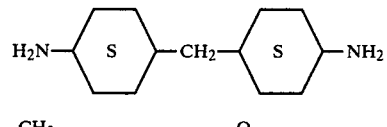

Very suitable polyfunctional amines are the polyoxypropyleneamines (aliphatic, terminally-branched, primary di- and tri-amines, structurally derived from polypropylene glycols and triols) commercially available under the trade designation "JEFFAMINE". A typical structure is as follows:

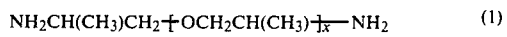   (1)

wherein x has an approximate value of from about 2.5 to about 3.5.

The instant epoxy curing agents are prepared by a unique two-step process using at least two different amines. In the first step the polyepoxide is reacted with the primary monoamine, preferably in the presence of a suitable solvent, at a temperature from about 20° C. to about 150° C. until the rate of reaction of the epoxy group approaches zero; the reaction time will generally range from about 20 minutes to about an hour and one-half. Typically, the time will range from about 15 to 45 minutes at 90° C. to 110° C.

The polyepoxide and monoamine are reacted in a ratio so that a stoichiometric excess of polyepoxide is employed. A very suitable chemical equivalent ratio of epoxy groups to amine groups is from about 2:1 to about 5:4.

Suitable solvents include the ketones such as acetone, methyl ethyl ketone, methyl iso-butyl ketone, and the like: aromatic hydrocarbons such as benzene, toluene, xylene, etc; alcohols such as methanol, ethanol, isopropanol, hexanetriol, etc; glycol ethers, mineral spirits, naphthas and other aromatic petroleum distillates. In general, most of the solvents customarily employed in epoxy compositions are suitable except esters. The amount of solvent employed can range quite widely, but will usually range from about 10% to about 50% by weight of the total reaction mixture.

In the second step, the condensate from the first step is cooled from about 25° C. to about 75° C. The polyfunctional amine is then added and the mixture allowed to exotherm until the epoxy-amine reaction is essentially complete. The polyfunctional amine is utilized in a stoichiometric excess, and is preferably employed in the chemical equivalent ratio of epoxy groups to amine groups of from about 1.0:1.25 to about 1.0:3.0.

The resulting epoxy curing agent will range from a viscous liquid (or solution) to a semi-solid. As noted hereinbefore, these epoxy-amine adducts may be used to cure epoxy resins, especially in water-borne systems to produce coatings exhibiting reduced blushing and toxicity.

The epoxy-amine adduct curing agents may be employed within a wide range, but will generally be employed in a near stoichiometric amount. It will be appreciated that for some applications an excess of either component may be employed. As a matter of fact, a curing amount of the adduct is utilized for each application or end use.

Occasionally, it may be desirable to utilize the present epoxy-amine adduct curing agents in combination with conventional epoxy curing agents such as amines, acid anhydrides, imidazole compounds, etc. Suitable such co-curing agents are disclosed in U.S. Pat. Nos. 3,356,624, 3,408,219, 3,446,762, among many other patents.

Of course, when the instant epoxy-amine adduct curing agents are used to cure epoxy resins, other materials may be mixed or added, including plasticizers, stabilizers, extenders, resins, pigments, reinforcing agents, thixotropic agents, and the like.

These compositions may be utilized in many applications such as for coatings and impregnating compositions in the preparation of adhesives for metals, wood, cement and the like, and in the preparation of laminated products.

The following examples are given to illustrate the preparation and use of the instant novel epoxy-amine adduct epoxy curing agents. It is understood that the examples are embodiments only and are given for the purpose of illustration only and the invention is not to be regarded as limited to any specific components and/or specific conditions recited therein. Unless otherwise indicated, parts and percentages are parts and percentages by weight.

Coatings were applied with a doctor blade to obtain between 1 and 2 mils dry film thickness. The applied coatings were allowed to air-dry seven days at 24°-25° C. (75°-77° F.) and 50-60% relative humidity.

The following tests were used in testing the coatings:

Impact Resistance

The film was subject to a reverse impact using a Gardner Variable Impact Tester following the recommendations of ASTM D 2794-69.

Flexibility

The films were tested for flexibility using the Zuhr Conical Mandrel following the guidelines of ASTM D 522-60. The flexibility was reported the diameter of the mandrel at which failure occurred rather than percent elongation.

Hardness

The pencil hardness test was used to assess the hardness of the films. The hardness of the pencil which just does not cut the film is reported as the hardness. Pencil 6B is the softest and the hardness increases to 2B, B, HB, F, H, 2H up to 9H. For complete details see ASTM D 3363-74.

Solvent Resistance

The resistance of the films to solvent is usually taken as a measure of the degree of cure. It is a simple rapid test and generally the more solvent resistant coatings are also more chemical resistant. This property was measured by saturating a cotton ball with the solvent used, methyl isobutyl ketone (MIBK), and contacting the film with the wet cotton ball, and then attempting to cut the film with a pencil two degrees soften than the original hardness of the film. The time until the solvent-wet film could be cut in this manner is recorded as the solvent resistance.

Water Resistance

This property was usually measured by immersing a coated panel in water at a temperature of 38° C. (100° F.) for a period of 24 hours. The panels were then removed and observed.

Salt Spray

The panels were edged and backed, scribed to bare metal and exposed to 5% salt fog at 95° F. supported at an angle of 15-30 degrees from the vertical and observed periodically until failure. The procedure of ASTM D-117 was followed.

Weatherometer

The panels were backed and edged and placed in a Xenon arc weatherometer following the procedures of ASTM E-42 and E-239.

EXAMPLE I

This example illustrates the preparation of the present epoxy-amine adducts and to the use of the adduct as an epoxy curing agent in an aqueous paint formulation.

Into a four-necked flask equipped with stirrer, nitrogen blanket, thermometer, condensor and heating mantle was charged 40.88 parts by weight of Polyether A [a glycidyl polyether of 2,2-bis(4-hydroxyphenyl) propane, having an average molecular weight of 370 and an epoxide equivalent weight of about 180]. The temperature was raised to 90° C. and 7.62 parts by weight of aniline slowly added through a separatory funnel over a 30 minute period. Cooling was applied during the aniline addition to maintain temperature at 90°–95° C. Temperature was held at 90°–95° C. for 60 minutes, and then 51.50 parts by weight of the monethylether of ethylene glycol was stirred in to complete the first step of the preparation.

In the second step, a similar reaction flask was charged with 30.15 parts by weight of the precondensate resin solution form Step I, along with 7.88 parts by weight of a polypropylene oxide diamine, molecular weight 230–240 (Jeffamine D-230) and 1.68 parts by weight diethylene triamine. The temperature is raised to 70° C. and maintained while 60.29 parts by weight of the precondensate resin solution from the first step is added over a 60 period. Heating is continued for an additional 90 minutes after the addition of the precondensate resin solution; to complete the adduct preparation.

The chloride salt of the above adduct was formed by stirring in concentrated HCl, 8 parts by weight with respect to 100 parts of the adduct solution.

A paint was prepared from the following composition:

| Part I | |
|---|---|
| Chloride salt of adduct as described above | 203 |
| Titanium Dioxide | 210 |
| Aromatic hydrocarbon, boiling range 163–175° C. | 29 |
| Distilled Water | 266 |
| Part II | |
| Diglycidyl Ether of Bisphenol-A (weight per epoxide 180) | 63 |
| Monoethyl ether of ethylene glycol | 11 |

Part I was made by dispersing the titanium dioxide pigment in the chloride salt of the adduct solution along with the aromatic hydrocarbon to a North Standard grind gauge reading of 7–8. The water was then mixed in. Part II was prepared by blending the liquid epoxy resin with the glycol ether solvent.

Part I and II were thoroughly mixed and reduced to spray viscosity (30 seconds #4 Ford Cup) by stirring in 100 grams water.

Films of the above composition and a commercial 2-pack epoxy water-borne system with the same pigmentation were applied to cold rolled steel panels, and allowed to air-dry seven days. The coatings were evaluated for physical properties and salt spray resistance as shown below.

| | Adduct Cured System | Commercial Control |
|---|---|---|
| Gloss | Excellent | Very Good |
| Flex (1–2 mil film) | ⅛" | ¼" |
| Pencil Hardness | 3H | 2H |
| Pencil Hardness after 5 minutes in Methyl Isobutyl Ketone | H | F |
| Salt Spray ASTM B-117-73 3-4 mil film 200 hours | | |
| Undercutting at Scribe | <1mm | <1mm |
| Blistering (ASTM Rating) | Few #8 | Few #8 |

EXAMPLE II

The procedure of Example I for the preparation of the adduct was repeated wherein the monoamine used in the first step was n-butylamine and the polyamine used in the second step was Jeffamine D-230 (D-230) or Diethylenetriamine (DTA). For comparison, an adduct of D-230 and Polyether A and an adduct of DTA and Polyether A were used at 100% stoichiometry to cure Polyether A. Solvent-based coatings deposited using MIBK/OXITOL glycol ether/toluene in 1:1:1 were prepared at a drawdown of 1.5 to 2.0 mils and air dried for 7 days at 24° C. and 45% relative humidity. The results are tabulated in Table I.

TABLE I

| Step I Amine | n-butyamine | | None | |
|---|---|---|---|---|
| Step II Amine | D-230* | DTA** | D-230 | DTA |
| Wedge Bend, mm. | 4–7 | 35–40 | 5–6 | 82 |
| Water Resistance, | Very Slight | Very Slight | Slight | Medium |
| Room Temp. | Blush | Blush | Blush | Blush |
| Impact, Reverse, in./# | >132 | >132 | >132 | >132 |
| Hardness, Pencil | 5H | >6H | 6H | 6H |
| MIBK Resistance | | | | |
| Time | 2 min | >7 hrs. | 2 min | 1 min |
| Hardness | 2H | 6H | 3H | 3H |

*adduct in OXITOL glycol ether
**adduct in MEK

EXAMPLE III

This example illustrates the preparation of the instant adduct epoxy curing agent using a saturated epoxy resin and to its use in curing epoxy resin.

To a 0.5 liter flask fitted with a thermometer, stirrer and reflux condenser is added 204 grams (0.84 equivalents) of a diglycidyl ether of hydrogenated 2,2-bis(4-hydroxyphenyl) propane (Polyether X) having a weight per epoxide (WPE) of 243, 12.68 (0.21 moles) of ethanol-amine, and 116.68 grams of OXITOL ® glycol ether (2-ethoxyethanol). The mixture was heated to 100° C. with stirring for 30 minutes. The mixture was then allowed to cool to 50° C. while being stirred. When the temperature reached 50° C., 43.32 grams (0.42 moles) of diethylenetriamine is dissolved 23.48 grams of OXITOL ® glycol ether is added all at once with stirring. The reaction mixture was stirred until the reaction exotherm was complete.

The resulting curing adduct was used to cure Polyether A in the ratio of 239 parts of the above solution to each equivalent of epoxide to produce film of excellent physical properties.

An aqueous dispersion of the above curing adduct is prepared by reacting 61.61 grams of the above adduct with 5.62 grams of glacial acetic acid with stirring.

When this emulsified curing adduct is added to Polyether A (390 grams to one equivalent of epoxide) the resulting composition cured to form an excellent coating.

EXAMPLE IV

The following is charged to a four-neck one-liter flask equipped with a stirrer, reflux condenser and thermometer:

| Stage I | % W | Grams |
|---|---|---|
| Polyether x | 51.00 | 408.0 |
| Ethanolamine | 3.17 | 25.4 |
| OXITOL ® Glycol Ether | 29.17 | 253.4 |

The flask is heated with stirring to 100° C. in 15-30 minutes. Any exotherm is moderated with cooling water and the reaction held at 100° C. for 30 minutes. The mixture is then cooled to 50° C. slowly (about 60–90 minutes) with stirring and the following added all at once:

| Stage II | % W | Grams |
|---|---|---|
| Diethylenetriamine (DTA) | 10.83 | 86.6 |
| OXITOL ® Glycol Ether | 5.83 | 46.6 |
| | 100.00 | 800.00 |

| Time | Temp. | Remarks |
|---|---|---|
| 1420 | RT | Heat on |
| 1432 | 102° C. | Hold |
| 1505 | 100° C. | Cool to 50° C. |
| 1540 | 53° C. | Add DTA |
| | 100° C. | Exotherm, cool and package |

The reaction mass is stirred and allowed to exotherm (ca 90° C.) and cool to 50°-70° C. when it is packaged and allowed to equilibrate overnight before use.

| Constants | |
|---|---|
| Viscosity (Gardner-Holdt) | Z₃ |
| Color (Gardner) | 1 |
| Weight per Gallon | 8.62 pounds |
| Solids | 66.1% W |

A curable water-borne coating composition of the above curing agent composition was prepared as follows:

| Component | Weight % |
|---|---|
| Polyether X | 23.92 |
| Curing Agent | 40.19 |
| Above adduct (80% NVM) | 50.00% W |
| Acetic Acid | 5.70% |
| Water | 44.30 |
| | 100.00 |
| Water | 35.89 |
| | 100.00% |

Total Solids 40% by weight

EXAMPLE V

The procedures of Examples I through IV were essentially repeated wherein curing agents were prepared using various primary monoamines in the first stage and various polyfunctional amines in the second stage with polyether. The resulting curing agent adducts were used to cure Polyether at 80% calculated stoichiometry and the coatings forced dried twenty minutes at 90° C. (200° F.).

The results are tabulated in Table I.

TABLE I

| Primary Monoamine | Polyfunctional Amine | Impact | Flexibility | Pencil Hardness | MIBK Resistance Min |
|---|---|---|---|---|---|
| MEA | D-230 | <4 | ⅛ | HB | <1 |
| NBAm | D-230 | <4 | ⅛ | 5B (2) | <1 |
| BzAm | D-230 | <4 | ⅛ | 2B | <1 |
| AMP | D-230 | <4 | ⅛ | B | <1 |
| Aniline | D-230 | <4 | ⅛ | HB | <1 |
| MEA | DTA | <4 | fail | 3H | <1 |
| NBAm | DTA | <4 | fail | 2H | <1 |
| BzAm | DTA | 4 | fail | H | <1 |
| AMP | DTA | <4 | fail | 2H | <1 |
| Aniline | DTA | — | — | — | — |
| None | D-230 | 160 | ⅛ | 5B | <1 |
| None | DTA | <4 | ⅛ | F | <1 |

Key:
(2) = Tacky;
MEA = ethanolamine;
NBAm = n-butylamine;
BzAm = Benzylamine;
AMP = aminomethylpropanol;
DTA = diethylenetriamine;
D-230 = Jeffamine D-230.

EXAMPLE VI

The procedure of Example V was essentially repeated wherein Polyether X was used at 100% calculated stoichiometry and the coating cured at room temperature for 7 days. The results using a number of curing agent adducts are tabulated in Table II.

TABLE II

| Primary Monoamine | Polyfunctional Amine | Impact | Flexibility | Pencil Hardness | MIBK Resistance min | 38° C. Water Resistance (100° F.) | | | |
|---|---|---|---|---|---|---|---|---|---|
| | | | | | | 1 hr | 3 hr | 6 hr | 24 hr |
| MEA | D-230 | 40 | ⅛ | 2H(1) | 1 | U | U | U | U |
| NBAm | D-230 | 96 | ⅛ | 3H | 1 | U | V.Sl.Wh. | V.Sl.Wh. | V.Sl.Wh. |
| BzAm | D-230 | 36 | ⅛ | 3H | 1 | U | U | U | U |
| AMP | D-230 | 8 | ⅛ | 3H | 1 | U | U | U | U |
| Aniline | D-230 | 4 | Fail | 3H | 1 | U | U | U | U |
| MEA | DTA | 116 | ⅛ | 3H | 22 | V.Sl.Wh. | Sl.Wh. Mod.B. | Sl.Wh. Hv.B. | Wh. Hv.B. |
| NBAm | DTA | 92 | ⅛ | 3H(4) | 3 | Sl.Wh. | U | Sl.Wh. Mod.B. | Hv.B. |
| BzAm | DTA | 56 | ⅛ | 3H(4) | 3 | Sl.Wh. | U | Mod.B. | Hv.B. |
| AMP | DTA | 40 | ⅛ | 3H(4) | 2 | Sl.Wh. | Sl.Wh. Sl.B. | Mod.B. | Hv.B. |
| Aniline | DTA | 36 | ⅛ | 3H(4) | 3 | Sl.Wh. | Sl.B. | Mod.B. | Hv.B. |
| None | D-230 | 140 | ⅛ | 3H | 1 | U | U | U | U |
| None | DTA | 88 | ⅛ | 5H(4) | 3 | Sl.Wh. | Sl.Wh. | Sl.Wh. | Wh. |

TABLE II-continued

| Primary Monoamine | Polyfunctional Amine | Impact | Flexibility | Pencil Hardness | MIBK Resistance min | 38° C. Water Resistance (100° F.) | | | |
|---|---|---|---|---|---|---|---|---|---|
| | | | | | | 1 hr | 3 hr | 6 hr | 24 hr |
| | | | | | | | | Sm.B. | Sm.B. |

Key:
(1) = Slightly Tack;
(2) = Tacky;
(4) = Blush;
Sl = Slight;
Sc = Scattered;
SM = Small;
B = Blister;
Wh = White;
U = Uneffected;
V = Very;
Mod = Moderate;
Hv = Heavy;
Mea = ethanolamine;
NBTm = n-butylamine;
BzAm = benzylamine;
AMP = aminomethylpropanol;
DTA = diethylenetriamine;
D-230 = Jeffamine D-230.

What is claimed is:

1. An adduct suitable for curing epoxy resins prepared by (A) reacting (1) an epoxy compound containing more than one vicinal epoxy group per molecule with (2) a primary monoamine in the chemical equivalent ratio of epoxy groups to amine groups from about 2:1 to about 5:4, and then (B) reacting the resulting condensate with a polyfunctional amine in the chemical equivalent ratio of epoxy to amine groups from about 1:1.25 to about 1:3.0.

2. The adduct of claim 1 wherein the epoxy compound is a diglycidyl ether of a polyhydric phenol.

3. The adduct of claim 2 wherein the epoxy compound is a diglycidyl ether of 2,2-bis(4-hydroxyphenyl) propane.

4. The adduct of claim 1 wherein the epoxy compound is a diglycidyl ether of hydrogenated 2,2-bis(4-hydroxyphenyl) propane.

5. The adduct of claim 1 wherein the primary monoamine has the general formula

R—NH$_2$ wherein R is an alkyl, aryl, alkaryl or alkanol radical containing up to about 20 carbon atoms.

6. The adduct of claim 5 wherein the primary monoamine is ethanolamine.

7. The adduct of claim 5 wherein the primary monoamine is butylamine.

8. The adduct of claim 5 wherein the primary monoamine is aniline.

9. The adduct of claim 5 wherein the primary monoamine is benzylamine.

10. The adduct of claim 5 wherein the primary monoamine is aminomethyl propanol.

11. The adduct of claim 1 wherein the polyfunctional amine has the general formula:

NH$_2$—R$(-$NH—R$)_x$NH$_2$ wherein each R is an alkyl, anyl or alkanyl radical of up to about 8 carbon atoms and x has a value of from about 0 to about 10.

12. The adduct of claim 11 wherein the polyfunctional amine is diethylenetriamine.

13. The adduct of claim 1 wherein the polyfunctional amine is a polyoxypropyleneamine of the general formula:

NH$_2$CH(CH$_3$)CH$_2(-$OCH$_2$CH(CH$_3)-)_{\overline{x}}$NH$_2$ wherein x has an approximate value of from about 2.5 to about 3.5.

14. A curable composition comprising an epoxy resin and a curing amount of the adduct of claim 1.

* * * * *